(12) United States Patent
Hardie-Bick (10) Patent No.: US 10,345,960 B2
(45) Date of Patent: Jul. 9, 2019

(54) TRANSMITTING DATA (71) Applicant: Anthony Richard Hardie-Bick, London (GB)

(72) Inventor: Anthony Richard Hardie-Bick, London (GB)

(*) Notice: Subject to any disclaimer, the term of this patent is extended or adjusted under 35 U.S.C. 154(b) by 0 days.

(21) Appl. No.: 16/142,700

(22) Filed: Sep. 26, 2018

(65) Prior Publication Data

US 2019/0064993 A1 Feb. 28, 2019

Related U.S. Application Data (63) Continuation-in-part of application No. 15/886,310, filed on Feb. 1, 2018.

(30) Foreign Application Priority Data

Feb. 5, 2017 (GB) .................................. 1701877.1
Nov. 3, 2017 (GB) .................................. 1718258.5

(51) Int. Cl.
*G06F 3/041* (2006.01)
*G06F 3/044* (2006.01)
*G06F 3/01* (2006.01)
*H04B 1/02* (2006.01)
(Continued)

(52) U.S. Cl.
CPC ............ *G06F 3/0416* (2013.01); *G06F 3/017* (2013.01); *G06F 3/044* (2013.01); *G06F 3/04883* (2013.01); *H04B 1/02* (2013.01); *G06F 3/0346* (2013.01); *G06F 2203/04104* (2013.01)

(58) Field of Classification Search
CPC .... G06F 3/0346; G06F 3/017; G06F 3/04815; G06F 2203/0384; G06F 3/041; G06F 3/0416; G06F 3/044
See application file for complete search history.

(56) References Cited

U.S. PATENT DOCUMENTS

| 6,891,527 | B1 | 5/2005 | Chapman et al. |
| 2012/0154267 | A1 | 6/2012 | Albano et al. |
| 2013/0027299 | A1 | 1/2013 | Tsukahara et al. |

(Continued)

FOREIGN PATENT DOCUMENTS

| EP | 3190483 A1 | 7/2017 |
| WO | 2007077124 A1 | 7/2007 |
| WO | 2011011898 A1 | 2/2011 |

OTHER PUBLICATIONS http://lauralahti.com/The-Smartball, Dec. 2011.

*Primary Examiner* — Gerald Johnson
(74) *Attorney, Agent, or Firm* — Richard M. Goldberg (57) ABSTRACT

A substantially spherical hand-held input device which provides manual data input for navigating a virtual environment and other kinds of user interface, includes a capacitive touch sensor responsive to touch events anywhere on its surface, the touch sensor including a propagation-enhancing portion so that gestural radio signals can be transmitted through the touch-sensitive surface of the input device to a computer system during use, the propagation-enhancing portion being in the form of a spiral-shaped conductor that is also used for capacitance-sensing, and a multi-touch array includes multiple spiral-shaped touch-sensing conductors to provide the propagation-enhancing portion, and the propagation-enhancing portion is a metamaterial at a transmission frequency of the gestural radio signals.

20 Claims, 12 Drawing Sheets

(51) Int. Cl.
*G06F 3/0488* (2013.01)
*G06F 3/0346* (2013.01)

(56) References Cited

U.S. PATENT DOCUMENTS

| | | | |
|---|---|---|---|
| 2013/0147743 A1* | 6/2013 | Ludwig | G06F 3/041 345/173 |
| 2015/0054633 A1 | 2/2015 | Saddik et al. | |
| 2015/0097774 A1 | 4/2015 | Kabasawa et al. | |
| 2017/0031502 A1 | 2/2017 | Rosenberg et al. | |
| 2017/0269589 A1 | 9/2017 | Clarke et al. | |

* cited by examiner

TRANSMITTING DATA

CROSS REFERENCE TO RELATED APPLICATIONS

This application represents a continuation-in-part of U.S. patent application Ser. No. 15/886,310 filed on 1 Feb. 2018 and claims priority from UK Patent Application Numbers GB1701877.1 filed on 5 Feb. 2017 and GB1718258.5 filed on 3 Nov. 2017.

BACKGROUND OF THE INVENTION

1. Field of the Invention

The present invention relates to transmitting data wirelessly, and in particular relates to transmitting data from within an enclosed touch sensing surface of an input device.

2. Description of the Related Art

The computer mouse revolutionized desktop computing, and the touch screen subsequently revolutionized mobile computing. These two types of input system highlight the importance of user input devices, and demonstrate their ability to transform advanced technologies from expensive scientific tools into low cost everyday items. In spite of diverse research efforts, there is no standard input device for navigating three-dimensional virtual environments. Virtual worlds are presented with increasingly high quality due to the decreasing cost of graphics processors, which are subject to Moore's law. Displays more than a meter across are commonplace consumer products. However, virtual environments displayed on them must be navigated using a joystick, or a mouse and keyboard, or using any one of several input technologies specialized for a particular application.

Examples of virtual environments include many kinds of computer games, three-sixty degree videos and photographs. Anyone with a web browser can, in theory, rotate, zoom and otherwise navigate these immersive experiences using a keyboard and mouse. However, this method of navigation is very cumbersome. Similarly, a smartphone can be used to view three-sixty videos by holding the device in the air and rotating it as if it were a virtual window. This viewing method is tolerable for a few tens of seconds, and serves primarily as a technology demonstrator.

One attempt to make virtual environments more comfortable is to use a virtual reality headset, which replaces most of the user's field of view with a pair of synthetic images, one for each eye. Head movements are tracked so that the images supplied to each eye are updated as if the user is actually in the virtual environment. Although the sense of immersion can be profound, it is easily broken when moving around the environment, due to the nature of input devices used to facilitate movement. Furthermore, a headset cuts the user off from their social environment, and may be uncomfortable to wear for extended periods of time. User movement in a virtual environment is known as locomotion, and the problem of locomotion in virtual reality (VR) is widely considered to be a fundamental obstacle to its wider adoption. However, more generally, user movement in any kind of three-dimensional virtual environment lacks a widely accepted universal input device analogous to the mouse or touch screen. This problem exists regardless the type of display system used.

In U.S. Pat. No. 6,891,527 B1 a hand-supported sphere is proposed as a universal input device. Passive acoustics are used to track the movement of a fingertip across the sphere's surface. The passive acoustic sensor aims to solve a particular problem: When using the sphere for input, it is rotated arbitrarily. Therefore, the entire surface must be activated uniformly for touch detection, otherwise a particular orientation would result in a user input gesture being impossible or difficult to detect. The touch-sensitive spherical surface encloses a radio transmitter that transmits gesture data to an external processing system. A resistive or capacitive touch-sensing matrix would act as a Faraday cage, attenuating or preventing radio transmissions from the input device being received. The passive acoustic system avoids this problem. However, passive acoustics relies on the sound created by a finger movement or tapping, and is limited in the vocabulary of gestures that can be detected.

Spherical input devices have been subsequently disclosed in US 2012/0154267 A1, US 2013/0027299 A1, US 2015/0054633 A1 US 2015/0097774 A1, WO 2007/077124 A1, and EP 3 190 483 A1. These documents describe freely-held spherical input devices that include one or more pressure sensors for detecting a force applied by squeezing the surface. The pressure sensors are sparsely located, avoiding the need to transmit radio signals through the conductive matrix of a resistive or capacitive touch sensor that fully covers the surface. However, squeezing is not as easy to do as touch, and these devices also have a relatively limited gestural vocabulary. In WO 2011/011898 A1 and https://lauralahti.com/The-Smartball, a freely held spherical input device is described, but these documents do not address the technical problem of providing a touch sensor that fully covers a spherical surface.

The potential of a spherical input device for universal input is significantly limited by the kinds of gestures that known systems can detect, especially compared to the sophisticated touch screen interactions, such as pinch and zoom, that most people are now familiar with.

BRIEF SUMMARY OF THE INVENTION

According to a first aspect of the present invention, there is provided an apparatus for manual data input, comprising a substantially spherical touch-sensitive outer surface arranged to be supported within the hands of a user, a capacitive touch sensor configured to generate surface touch signals for touched areas at substantially any location on the outer surface in response to a touch-responsive capacitance formed between capacitance-sensing elements of the touch sensor, a device processor for generating gestural data in response to the surface touch signals, and a radio transmitter for generating gestural radio signals from the gestural data and arranged to transmit the gestural radio signals through the outer surface, wherein the touch sensor includes a propagation-enhancing portion for enhancing propagation of the gestural radio signals through the touch-responsive capacitance. Preferably the propagation-enhancing portion is functionally part of a capacitance-sensing element that has a spiral shape.

According to a second aspect of the present invention, there is provided a method of transmitting data through a substantially spherical outer surface supported within the hands of a user, the outer surface enclosing a radio transmitter, a device processor and a capacitive touch sensor responsive to touched areas at substantially any location on the outer surface, comprising the steps of generating surface touch signals in response to a touch-responsive capacitance formed between a first capacitance-sensing element of the touch sensor and a second capacitance-sensing element, providing the surface touch signals to the device processor, processing the surface touch signals to generate gestural data, supplying the gestural data to the radio transmitter to generate gestural radio signals, and transmitting the gestural radio signals through the touch-responsive capacitance.

BRIEF DESCRIPTION OF EXAMPLE EMBODIMENTS

Figure 1:
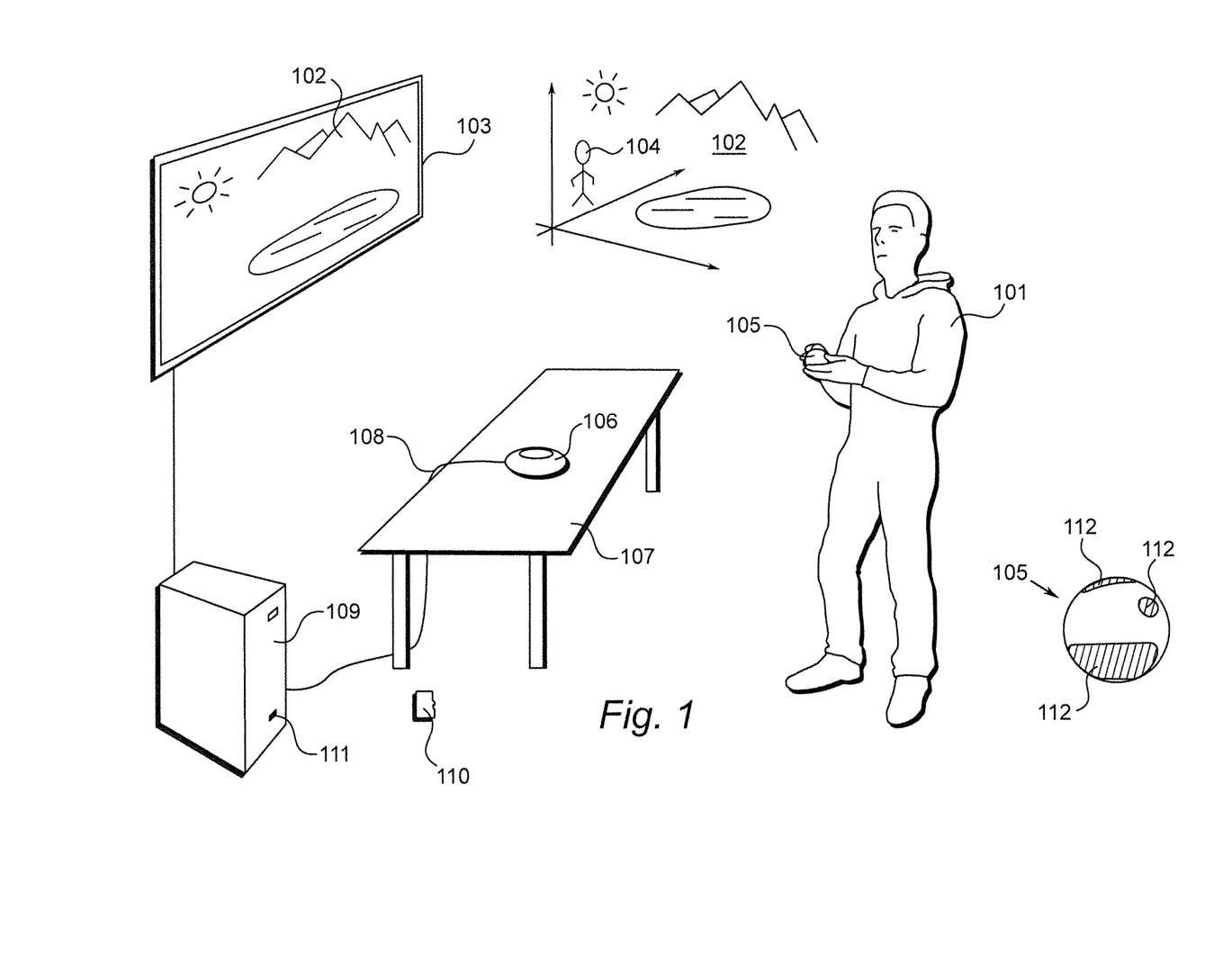
FIG. 1 shows a system for navigating a virtual environment, including an input device.

FIG. 1

A system for navigating a virtual environment in response to manual data input is shown in FIG. 1. A user 101 views a virtual environment 102 shown on a display 103. The user's point-of-view 104 in the virtual environment 102 is adjusted by user manipulation of a spherical input device 105, which provides manual data input. A receiver 106 receives radio transmissions from the input device 105. The receiver 106 also functions as a supportive base 106 for the input device 105 when it is not in use. The receiver 106 also includes wireless charging inductors for charging the input device 105. The receiver 106 rests on a desktop 107 and is connected via a USB connection 108 to a processing system 109 which renders the virtual environment 102 and supplies rendered image data to the display 103.

A flash memory card 110 provides a computer-readable medium that stores instructions for the processing system 109, the supportive base 106 and the input device 105. The instructions are installed by connecting the memory card 110 to the processing system 109 via a memory card socket 111. The input device 105 detects user manipulations in the form of rotations, and has a touch-sensitive surface that detects the touched areas 112 of input device 105 that are contacted or in close proximity to the hands of the user 101. The input device 105 can be used to adjust or move the user's viewpoint 104 in the virtual environment 102 and may also be used at other times to navigate a menu system shown in the display 103 to select different virtual environments. In an embodiment, the input device 105 is used as a television remote control for selecting programs shown on the display 103.

Figure 2:
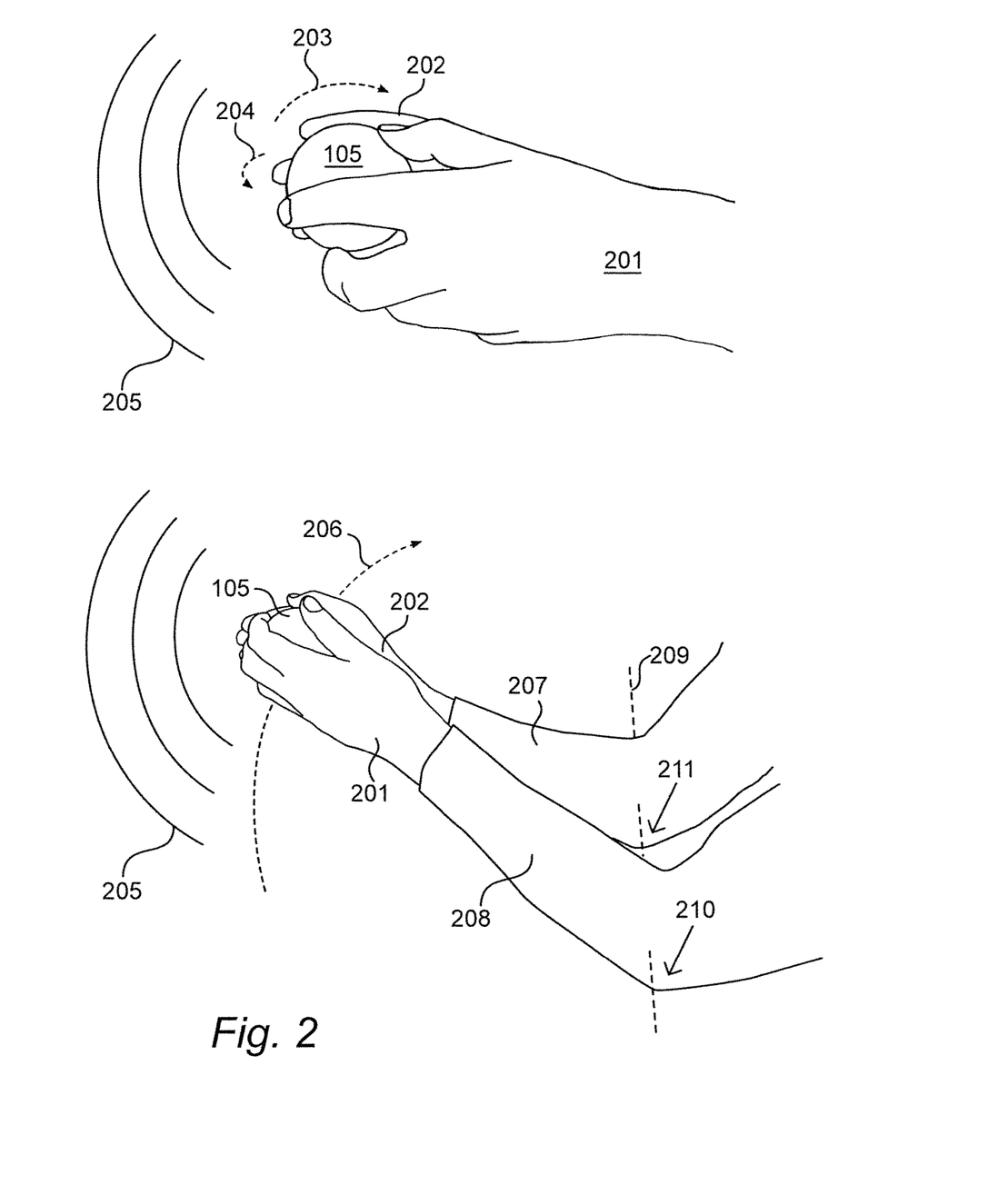
FIG. 2 details gestures performed by a user with the input device shown in FIG. 1.

FIG. 2

Examples of three types of manual data input performed with the input device 105 shown in FIG. 1 are shown in FIG. 2. The input device 105 is supported by the fingers of the user's left hand 201 and the user's right hand 202. A forward pitch rotation 203 of the input device 105 results in downward rotation of the user's viewpoint 104 in the virtual environment 102 displayed to the user 101 on the display 103. A lateral yaw rotation 204 results in a corresponding yaw rotation of the user's viewpoint 104 in the virtual environment 102. The gestures 203 and 204 are transmitted as gestural radio signals 205 to the receiver 106. The viewpoint rotation gestures 203 and 204 are made by rotating the input device 105 using the fingertips of one or both hands 201 and 202. During these gestures, only a small area 112 of the input device 105 is touched by the user's hands 201 and 202. Both rotation gestures 203 and 204 may be performed simultaneously.

Movement of the user's viewpoint 104 is achieved by enclosing the input device 105 more fully within one or both hands 201 and 202 in order to cover more than half the area of the input device's surface. A rotation 206 is then made by the user's forearms 207 and 208 about an imaginary axis 209 that passes roughly between the user's elbows 210 and 211. The gestural radio signals 205 include an indication of the touched area 112 of input device 105, and the rotation imparted to the device by the gesture 206 is used to move the user's viewpoint 104 forward in the virtual environment 102. In an embodiment, the virtual environment is provided by a three-sixty video, and the gesture 206 results in a zooming in effect, rather than movement of the user's viewpoint 104.

In order to distinguish between the rotation gestures 203 and 204 and the movement gesture 206, it is necessary to measure the area 112 of the user's hands 201 and 202 contacting, or nearly contacting, the surface of the input device 105. The user may comfortably use both hands 201 and 202, or a single hand 201 or 202 to make the gestures 203, 204 and 206. Reference to the user's hands hereinafter means one 201 or 202 or both the user's hands 201 and 202, as the input device 105 may be manipulated by one or both hands. Manipulations may be performed using fingertips or palms of the hands, or any combination thereof. Reference to the input device 105 being supported within the hands of the user 101 includes any such manipulation of the input device 105 performed by the user 101. Furthermore, it may not be possible to distinguish a touched area 112 from a nearly touching area, but in practice it is possible to obtain a measurement that indicates the area of the user's hands touching or in close proximity to the surface of the input device 105.

Figure 3:
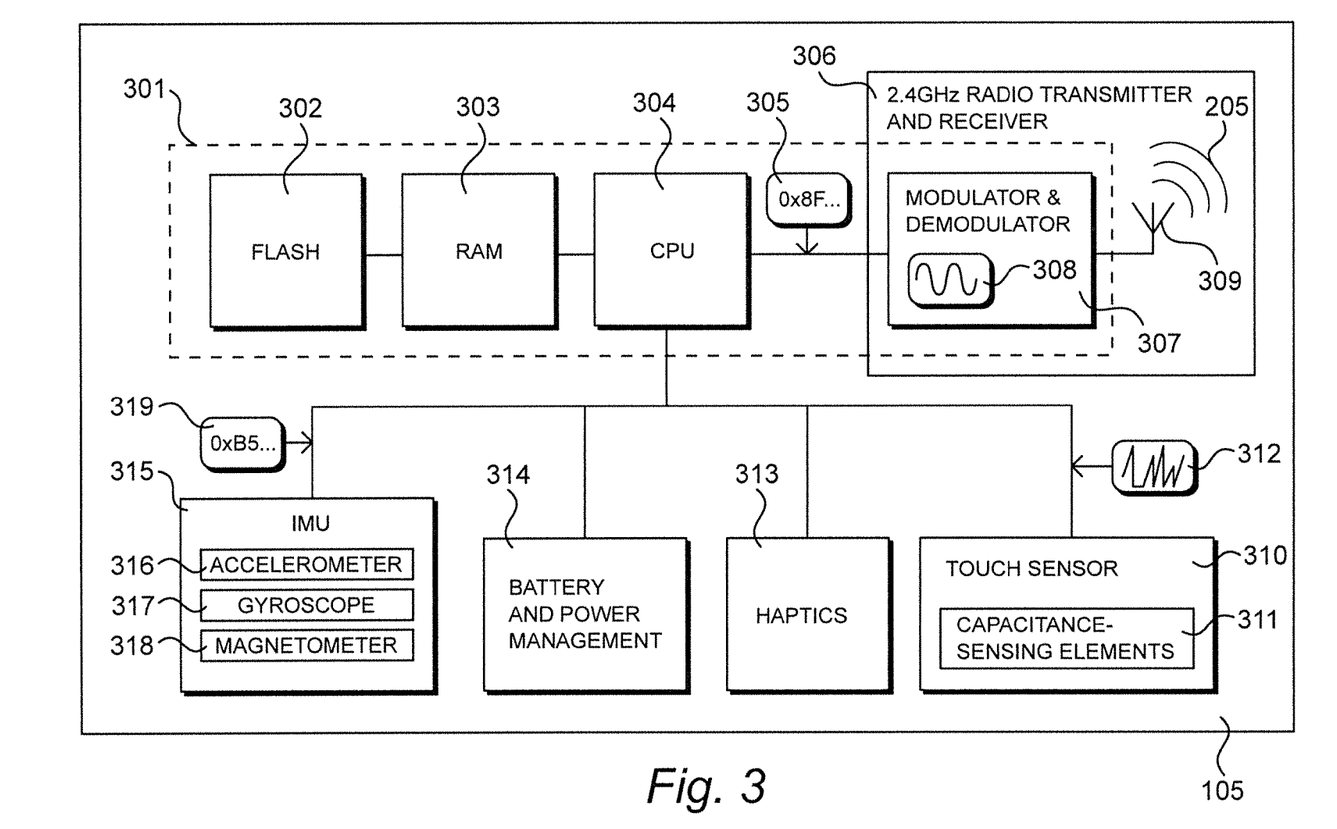
FIG. 3 details components in the input device shown in FIG. 1.

FIG. 3

The input device 105 shown in FIG. 1 is detailed in FIG. 7. An nRF52832 System on Chip (SOC) 301 includes 512 KB of FLASH 302, 64 KB of RAM 303 and a 32-bit ARM™ Cortex™ device processor (CPU) 304. The nRF52832 is available from Nordic Semiconductor, Nordic Semiconductor ASA, P.O. Box 436, Skøyen, 0213 Oslo, Norway. The device processor supplies gestural data 305 to a radio transmitter and receiver 306 operating in accordance with the low power Bluetooth™ 5.0 protocol. The radio transmitter and receiver 306 has a modulator and demodulator circuit 307, and circuitry for generating a carrier frequency 308 at one of several channel frequencies spaced two megahertz apart, in the range 2400 MHz to 2480 MHz. The carrier frequency 308 changes several times a second, in order to provide immunity to interference and multi-path fading. In an embodiment, a Direct Sequence Spread Spectrum (DSSS) pseudo-noise carrier is used, having a relatively large bandwidth compared to the requirements of the data being transmitted. In this case, the carrier frequency 308 may be considered as the range of frequencies that result from the spreading function. The radio transmitter and receiver 306 also includes an antenna 309 that converts electrical signals into gestural radio signals 205.

The input device 105 also includes a touch sensor 310, including capacitance-sensing elements 311. The touch sensor 310 generates surface touch signals 312 indicative of the contacting areas 112 between the input device's surface and the user's hands 201 and 202. A haptics peripheral 313 receives commands from the processing-system 109 to vibrate the input device 105 when appropriate. A battery and power management circuit 314 includes a battery and wireless charging inductors for charging the input device 105 when it is resting in the receiver 106.

A rotation-detector 315 is provided by an MPU-9250 Inertial Measurement Unit (IMU). The MPU-9250 is available from InvenSense Inc., 1745 Technology Drive, San Jose, Calif. 95110, U.S.A. The rotation-detector 315 includes a three axis accelerometer 316, a three axis gyroscope 317 and a three axis magnetometer 318. The accelerometer 316 and gyroscope 317 are each configured to generate new x-, y- and z-axis signal data at a rate of one thousand samples a second. The magnetometer generates new x-, y- and z-axis signal data at one hundred samples per second. As the user 101 rotates the input device 105, the change in orientation is converted into digital rotation-signals 319 supplied to the CPU 304, which then regularly updates an orientation quaternion at a rate of one thousand times per second.

The CPU 304 generates the gestural data 305 by processing the surface touch signals 312 with the rotation-signals 319, and transmits new gestural data 305 to the radio transmitter and receiver 306 at a rate of one hundred times a second. The CPU 304 initially processes the surface touch signals 312 to convert them into digital values over an expected range of touch input. The CPU 304 initially processes the rotation-data 319 by a process of sensor fusion, to generate an orientation value. The results of these processes are then combined in a packet of gestural data 305 supplied to the radio transmitter and receiver 306.

Figure 4:
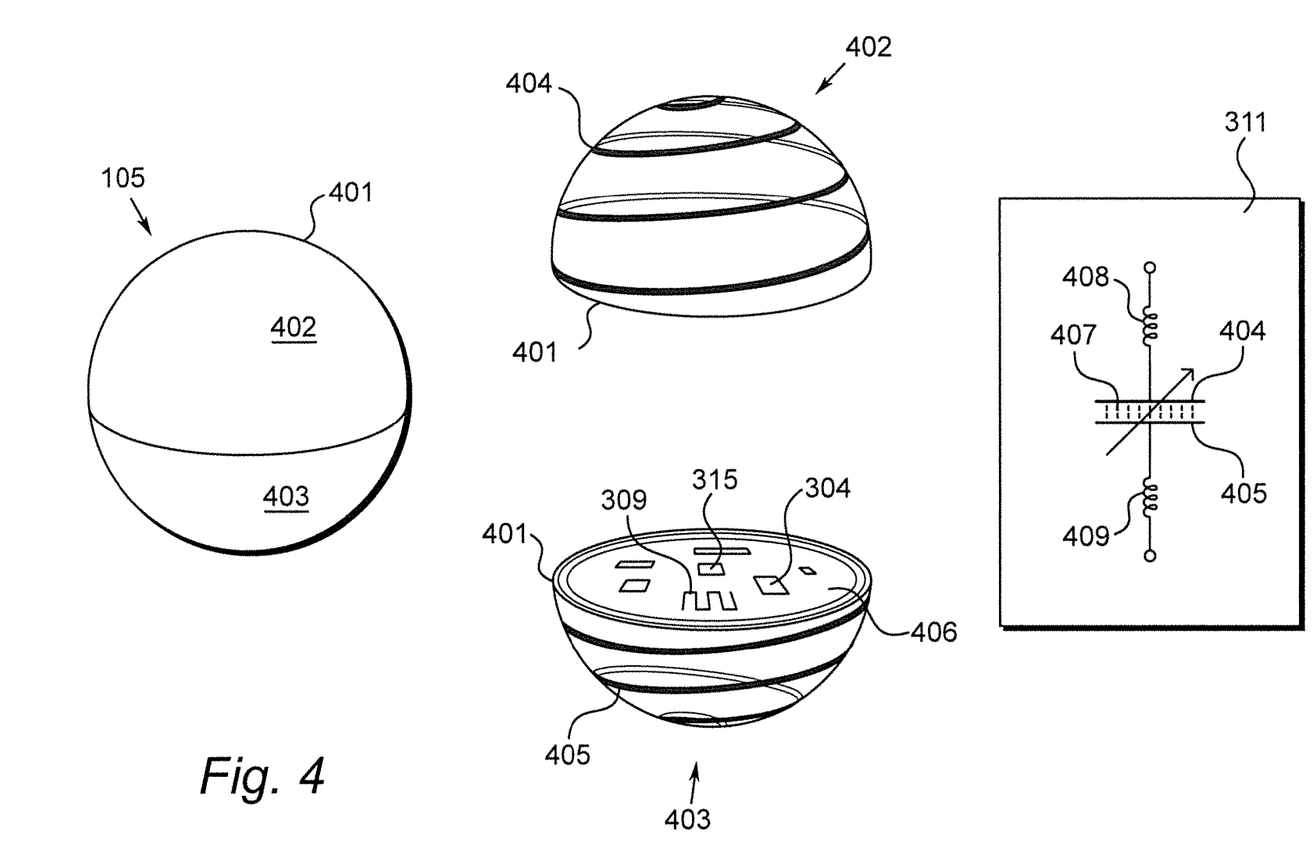
FIG. 4 details physical construction of the input device shown in FIG. 1, including a first capacitance-sensing element and a second capacitance-sensing element.

FIG. 4

Physical construction details of the input device 105 shown in FIG. 3 are detailed in FIG. 4. The input device 105 is an apparatus that has an outer surface 401 that contains the components shown in FIG. 3. The outer surface 401 includes a first hemisphere 402 and a second hemisphere 403. The first hemisphere 402 provides a first area of the outer surface 401, and includes a first spiral capacitance-sensing element 404. The second hemisphere 402 provides a second area of the outer surface 401, and includes a second spiral capacitance-sensing element 405. Each capacitance-sensing element 404 and 405 is formed of a spiral conductive foil strip on the inside of the outer surface 401 of the input device 105. The outer surface 401 is made from plastic, and provides electrical insulation between the capacitance-sensing elements 404, 405 and the user's hands 201, 202. A printed circuit board (PCB) 406 is mounted approximately at the interface between the first hemisphere 402 and the second hemisphere 403. The PCB 406 is slightly offset from the bisector of the input device 105, in order to compensate for the mass of the battery 314, which is located on the reverse side of the PCB 406. The rotation detector 315 is located near the center of the input device 105. The PCB 406 holds most of the components shown in FIG. 3, including the antenna 309 of the radio transmitter and receiver 306. The antenna 309 has the form of a meandered copper trace on the PCB 406.

The first hemisphere 402 and the second hemisphere 403 provide a touch-responsive capacitance 407 formed by the first capacitance-sensing element 404 and the second capacitance-sensing element 405. The touch-responsive capacitance 407 depends on the combined areas 112 of the user's hands touching or in close proximity to the two capacitance-sensing elements 404 and 405. Counter-intuitively, the touch-responsive capacitance 407 provides a good measure of the area of contact 112, even when the input device 105 has been rotated arbitrarily, and when the user's hands cover the two hemispheres 402 and 403 by different amounts.

FIG. 4 also includes a schematic of the touch-sensing elements 311. This includes the two capacitance-sensing elements 404 and 405 that form the touch-responsive capacitance 407. Also included in the schematic are a first inductive element 408 and a second inductive element 409. The inductive element 408 is due to parasitic self-inductance of the conductive foil strip of the first capacitance-sensing element 404 in combination with inductance resulting from its spiral shape. Physical parameters including width and thickness of the conductive foil, and relative proximity of neighboring parts of the spiral are chosen for an optimal compromise between the capacitance-sensing function and propagation of the gestural radio signals 205 through the touch-responsive capacitance 407 and therefore through the outer surface 401 and to the receiver 106. Therefore, the first capacitance-sensing element 404 also functions as a propagation-enhancing portion, because it has been designed to enable gestural radio signals to pass through the touch-responsive capacitance 407 with minimal attenuation.

Permutations of the physical parameters of the capacitance-sensing element 404 may be optimized for radio-transparency by mathematically modeling their radio-frequency characteristics, resulting in the best possible propagation of radio waves at a carrier frequency 308 of the gestural radio signals 205. The second capacitance-sensing element 405 has a similar design. An optimized capacitance-sensing element 404 or 405 of this kind may be considered as being a metamaterial effective at a carrier frequency 308 of the gestural radio signals 205. Thus, the capacitance-sensing elements 404 and 405 provide a propagation-enhancing portion for enhancing the propagation of the gestural radio signals 205 through the touch-responsive capacitance 407 and also provide the touch-responsive capacitance 407 from which the gestural data 305 is derived and through which the gestural data 305 is transmitted.

It will be appreciated that the inductive elements 408 and 409 are distributed along the length of the spiral capacitance-sensing elements 404 and 405, and the way the inductive elements 408 and 409 are shown in the schematic is a matter of convenience that does not fully represent their physical construction and behavior.

In an embodiment, the second capacitance-sensing element 405 is not used, and fixed-voltage conductive planes of the PCB 406 provide the second capacitance-sensing element 405. The result of this arrangement is a simpler physical construction at the cost of a reduction in signal-to-noise ratio of the touch sensor 310.

Figure 5:
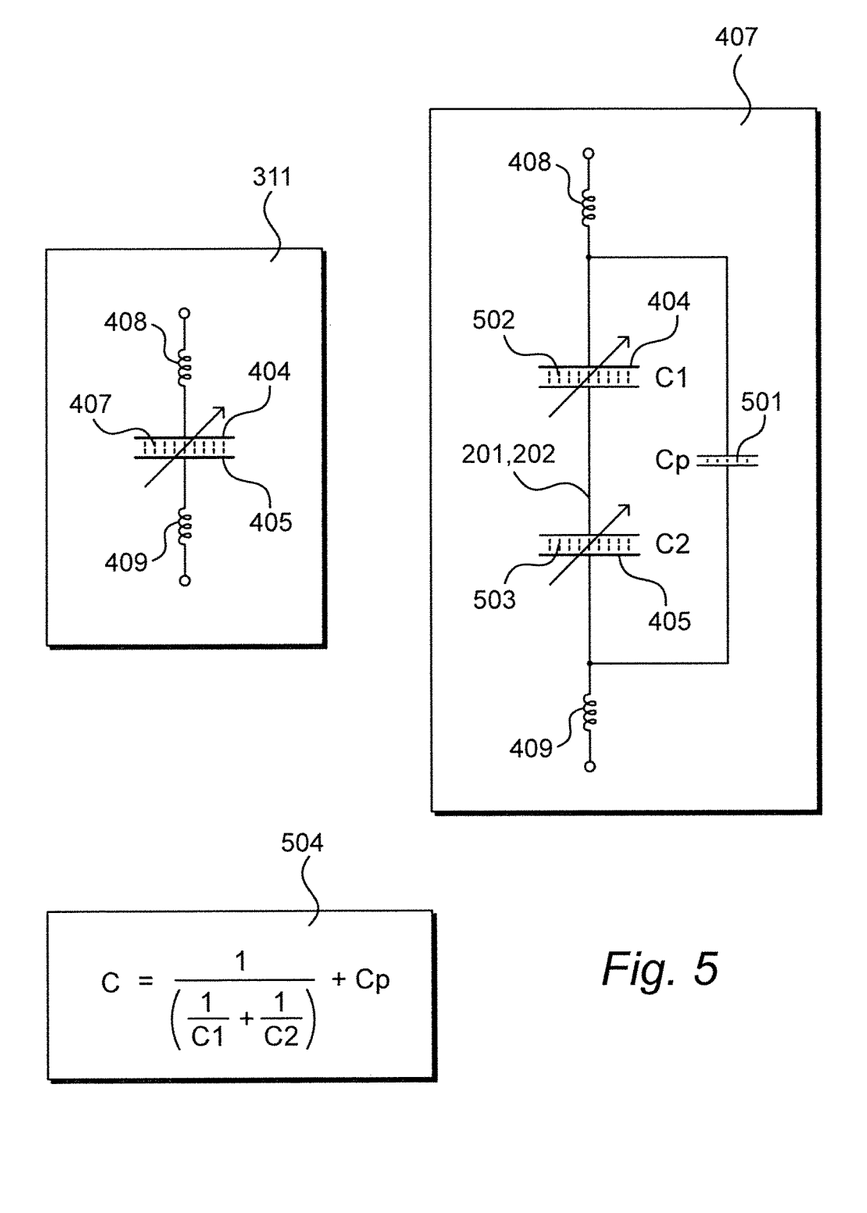
FIG. 5 details the capacitance-sensing elements shown in FIG. 4.

FIG. 5

The touch-responsive capacitance 407 shown in FIG. 4 is detailed in FIG. 5. The capacitance, C, of the touch-responsive capacitance 407, varies between about seventeen picofarads and twenty picofarads, depending on the touched area 112. The touch-responsive capacitance 407 includes a relatively large fixed parasitic capacitance, Cp, 501, of about seventeen picofarads, which is due to the capacitance between conductive areas on the PCB 406. The variable part of the touch-responsive capacitance 407 is formed by a series connection between a first variable capacitance, C1, 502 and a second variable capacitance, C2, 503. The first variable capacitance, C1, 502 is formed between the first capacitance-sensing element 404 and the user's hands 201, 202. The second variable capacitance, C2, 503 is formed between the user's hands 201, 202 and the second capacitance-sensing element 405. The capacitance, C, of the touch-responsive capacitance 407, is given by the equation shown at 504.

The touch sensor 310 gives similar output regardless the orientation of the input device 105. This immunity to orientation may be understood in the following way. In any orientation of the input device 105, it is natural for the user 101 to manually rotate the input device 105 with a significant area 112 of fingertips or palms touching the first-hemisphere 402 and the second-hemisphere 403. In an uneven distribution of the same area 112 across the two hemispheres 402 and 403, the first variable capacitance 502 is increased, and the second variable capacitance 503 is correspondingly decreased. Although the value of C, given by the capacitance equation 504, changes somewhat as a result of this new distribution, the difference does not have a significant effect on gesture interpretation in terms of the experience of the user 101. Therefore, the touch-responsive capacitance 407 gives a highly useful indication of the touched area 112, regardless of the orientation of the input device 105. The clear advantage of this touch sensor design is its simplicity.

Figure 6:
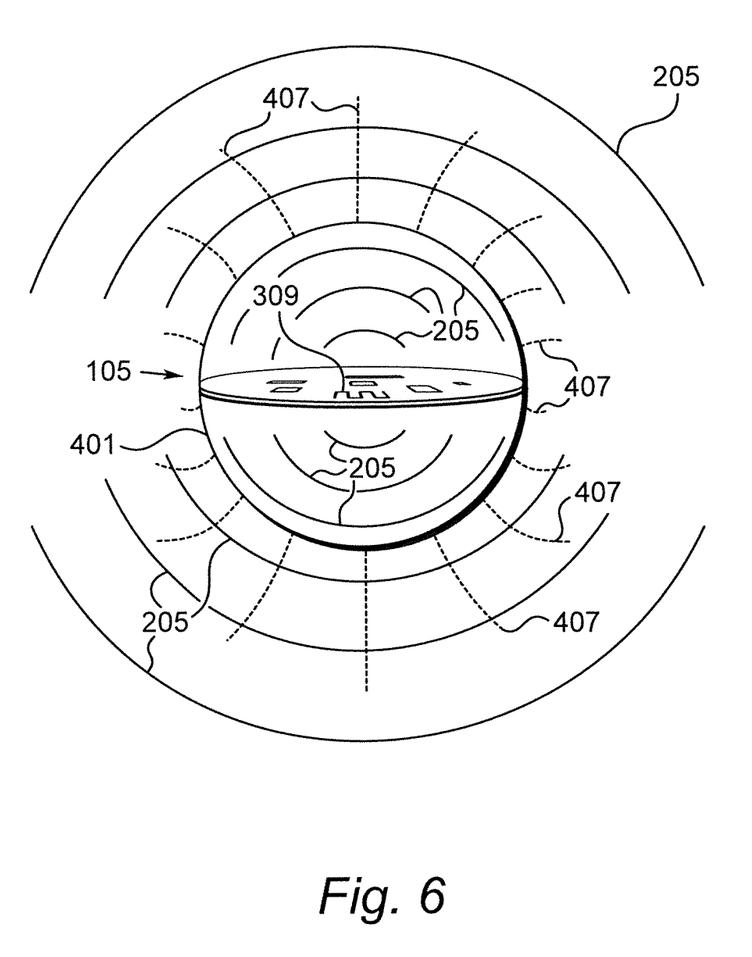
FIG. 6 summarizes the effect of the capacitance-sensing elements shown in FIG. 5.

FIG. 6

Figure 7:
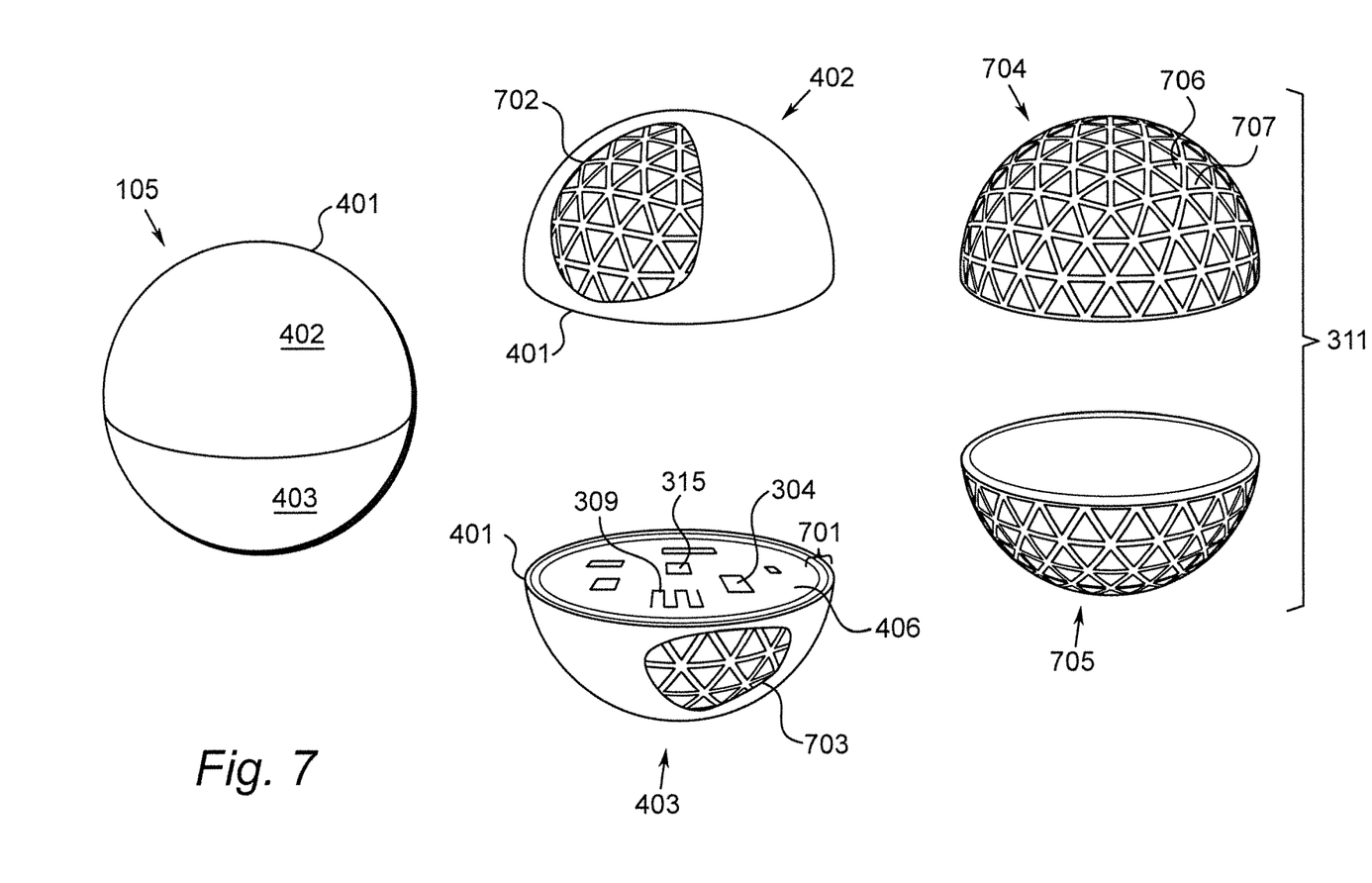
FIG. 7 details physical construction of the input device shown in FIG. 1 in accordance with an embodiment, including two arrays of touch-sensing elements.

Electrical fields and radio waves generated by the input device 105 shown in FIG. 7 are illustrated in FIG. 6. The touch-responsive capacitance 407 exists in a space that extends outwards from the input device 105, and is modified by the user's hands 201, 202 when they are in close proximity to its outer surface 401, in accordance with the equation 504 shown in FIG. 5. The antenna 309 transmits the gestural radio signals 205, which expand outwards from the antenna 309, passing through the outer surface 401 and the touch-responsive capacitance 407. Radio signals may be received reliably by the receiver 106, due to the construction of the capacitance-sensing elements 404, 405 which enhance propagation of the gestural radio signals 205 through the touch-responsive capacitance 407, relative to known capacitance touch sensor designs.

While it may be possible to synchronize radio transmissions so that they do not coincide with measurements made by the touch sensor 310, it will be appreciated that the propagation of the gestural radio signals 205 through the space that is occupied by the touch-responsive capacitance 407 at the same or different times, is made possible by the physical construction of the capacitance-sensing elements 404, 405. Therefore, the touch-responsive capacitance 407 is considered as existing constantly, even though it is only measured at brief intervals, in accordance with established techniques of capacitance-to-digital measurement known by those skilled in the art.

The capacitance-sensing elements 404 and 405 are radio-transparent to a significant degree, and enable gestural radio signals 205 to propagate through the outer surface 401 relatively unimpeded. It will be appreciated that the outer surface 401 is often significantly covered by areas of the user's hands 201, 202, and it is therefore necessary that the remaining uncovered areas permit the gestural radio signals 205 to pass through them with minimum attenuation. The touch sensor shown in FIG. 6 permits a robust, reliable and low cost input device 105 to be manufactured, that combines rotation-detection with touch-sensitivity, enabling a highly intuitive set of gestures to be used for navigating the virtual environment 102.

FIG. 7

Physical construction details of a second embodiment of the input device 105 shown in FIG. 3 are detailed in FIG. 7. The outermost structure 701 of the spherical shell includes several layers. Both hemispheres 402 and 403 include an array of touch-sensing elements, shown beneath the outer surface 401 at cutaway areas 702 and 703. These touch-sensing elements facilitate detection of the location of individual touched areas 112, and provide a multi-touch sensor capable of identifying the size, shape and location of multiple, separately touched areas on the outer surface 401 of the input device 105.

Beneath the outer surface 401 are the printed conductive traces of the arrays of touch-sensing elements. The touch sensor 311 includes upper and lower hemispheres of arrays shown at 704 and 705. Each individual touch-sensing element 706 or 707 is triangular in shape. The triangular tiling is obtained by the recursive subdivision of an icosahedron projected onto a bounding sphere. Each hemisphere has one hundred and sixty touch-sensing elements, giving a total of three hundred and twenty. The touch-sensing elements are flat, and a molded plastic interface layer is provided so that the outer surface of the input device 105 is a smooth sphere.

Figure 8:
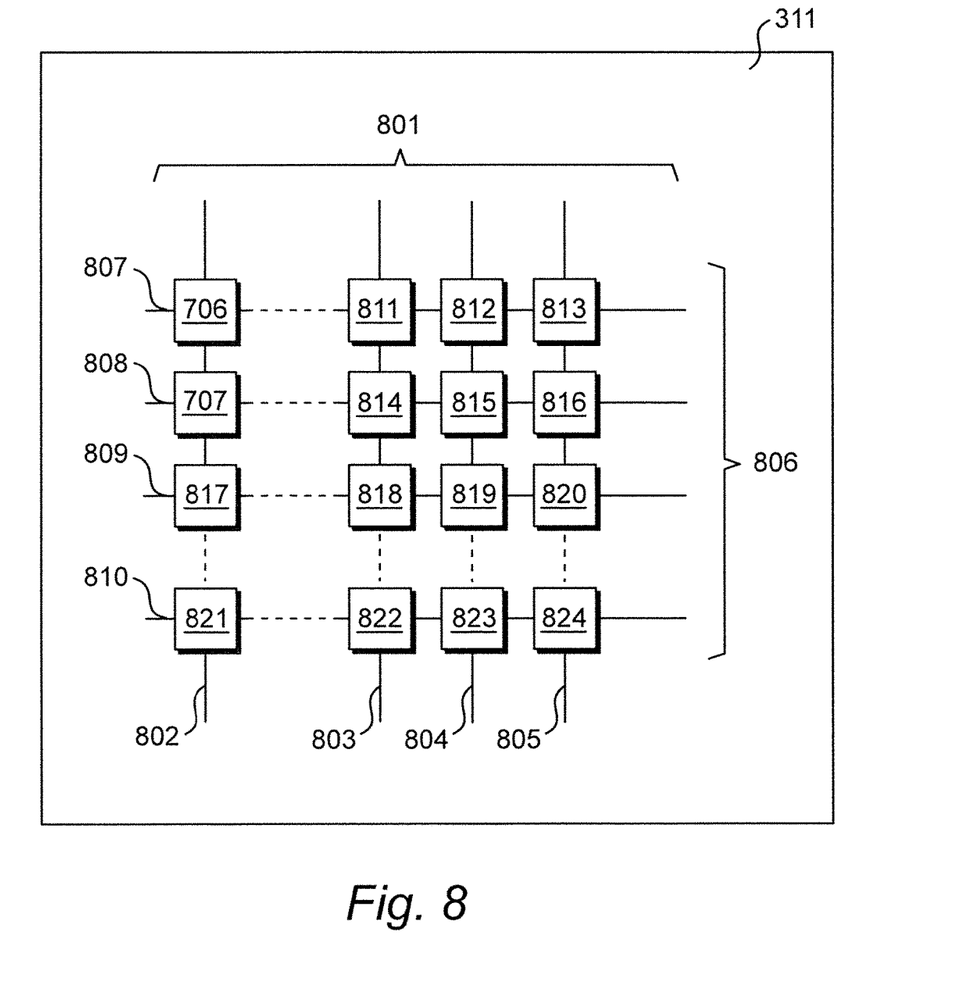
FIG. 8 details electrical connections for the array of touch-sensing elements shown in FIG. 7.

FIG. 8

Figure 11:
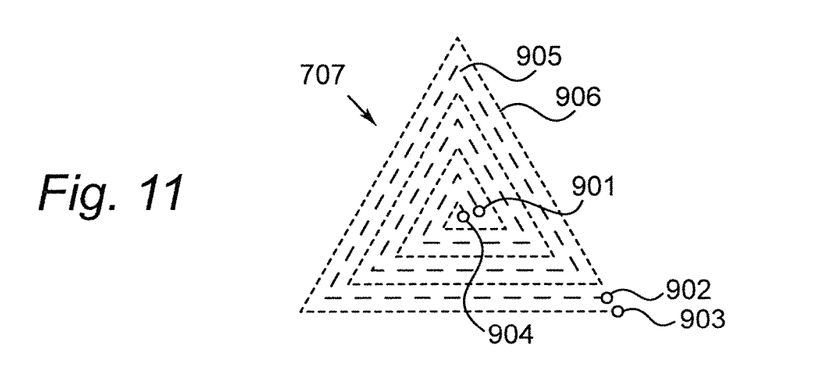
FIG. 11 details electrical connection points to the touch-sensing element shown in FIG. 10.

The touch sensor 311 shown in FIG. 7 is electrically arranged in a two dimensional grid of touch-sensing elements, as shown in FIG. 8. It will be appreciated that, due to the spherical tiling of the sensor arrays 704 and 705, some rows and columns of the grid will have fewer or greater numbers of touch-sensing elements. The columns 801 include columns 802, 803, 804 and 805. The rows 806 include rows 807, 808, 809 and 810. The touch-sensing element 706 is connected at column 802 and row 807. The touch-sensing element 707, shown in FIG. 11, is connected at column 802 and row 808. Other touch-sensing elements, of the same type, connect at other rows and columns, as indicated at 811 to 824. The array of touch-sensing elements is multiplexed. Each column can be individually set to a high or low voltage by a pin on the SOC 301. Each row is then connected to a capacitance measurement circuit. A sequence of charging and discharging cycles is used to perform measurements that are subsequently processed by the device processor 304 to calculate the capacitance at each individual touch-sensing element, in accordance with known mutual capacitance sensing methods. The mutual capacitance at a particular touch-sensing element is inversely related to the proximity of the user's hands 801 and 802.

Figure 9:
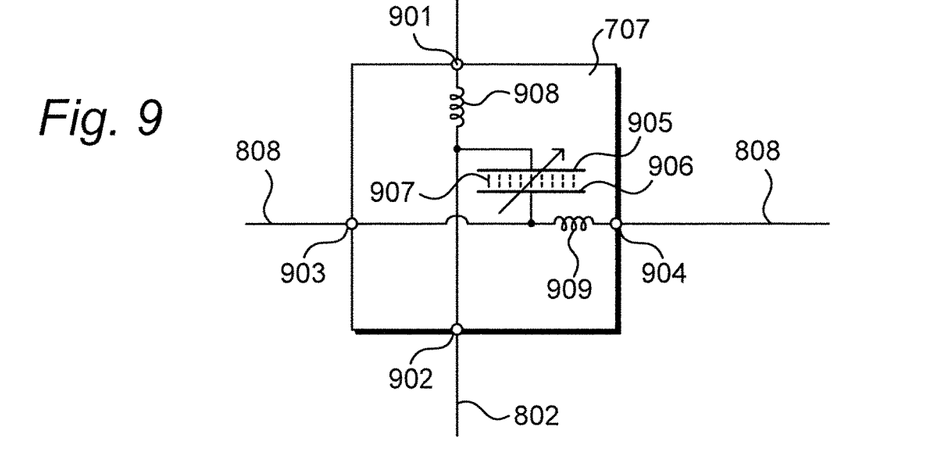
FIG. 9 shows a schematic of a touch-sensing element of the type shown in FIG. 7.

FIG. 9

The touch-sensing element 707 shown in FIG. 7 is detailed in FIG. 9. The touch-sensing element 707 has series connections 901 and 902 that make it part of the array column 802. Series connections 903 and 904 make the touch-sensing element 707 part of the array row 808. The touch-sensing element 707 is a mutual capacitance sensor in which two closely coupled capacitance-sensing elements 905 and 906 define a touch-responsive capacitance 907. The touch-responsive capacitance 907 reduces with increasing proximity of a user's hands, due to a process of charge-stealing. Inductive elements 908 and 909 have a high reactance at a carrier frequency 308 of the radio transmitter and receiver 306. This effectively isolates the touch-sensing element 707 from its neighboring elements in the array, with respect to the carrier frequency 308. However, for the purposes of obtaining touch sensor signals 312, the inductors do not significantly interfere with the process of performing capacitance measurements, due to the frequencies of charging and discharging being far lower than the carrier frequency 308.

Figure 10:
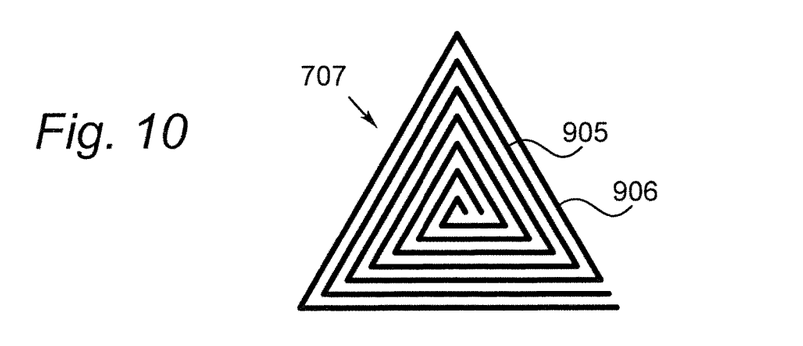
FIG. 10 details physical construction of the touch-sensing element shown in FIG. 9.

FIG. 10

Physical construction of the touch-sensing element shown in FIG. 9 is detailed in FIG. 10. The first capacitance-sensing element 905 and the second capacitance-sensing element 906 take the form of inter-woven spirals of conductive foil. This has two effects. The mutual capacitance between the capacitance-sensing elements 905 and 906 is maximized, because their parallel length is extended compared to the area they occupy. In known mutual capacitive touch sensors, the same capacitance-maximizing effect is achieved using inter-digitation patterns. However, as shown in FIG. 9, the two-dimensional triangular spiral shape provides each capacitance-sensing element 905 and 906 with propagation-enhancing characteristics. The inductive element 908 is distributed over the length of the first capacitance-sensing element 905. This can be observed in the layout shown in FIG. 10. Similarly, the inductive element 909 is distributed over the length of the second capacitance-sensing element 906. The inductive elements 908 and 909 provide reactance effective at the radio transmission frequency 308. This breaks up the Faraday cage that would otherwise be formed by the touch sensor array 704, enabling the gestural radio signals 205 to pass through it. The inductive elements 908 and 909 therefore provide a propagation-enhancing portion of the touch sensor 310.

The design of the touch-sensing element 707 is repeated for the other touch-sensing elements in the arrays 704 and 705. The design shown in FIG. 10 serves two purposes: Firstly, to detect touch, and secondly, by virtue of its inductive elements 908 and 909, to ensure that the gestural radio signals 205 propagate through the arrays of touch-sensing elements 704 and 705. Physical characteristics of the capacitance-sensing elements 905 and 906 can be optimized in terms of conductor thickness, shape and size, in order to maximize propagation of the gestural radio signals 205 through an array of such elements, thus defining a metamaterial. Such optimization may be performed by experimentation or by modeling the physical system and iterating through permutations of physical characteristics until a good compromise between radio-transparency and touch-sensitivity is obtained.

Each tiled touch-sensing element 706, 707 is physically much smaller than the wavelength of a carrier frequency 308 of the gestural radio signals 205, which, at 2.4 GHz, is about 12 cm. Breaking-up the conduction of the columns 801 and rows 806 using inductive elements, such as inductive elements 908 and 909, prevents the touch sensor's arrays 704 and 705, which completely enclose the radio transmitter 306, from acting as a Faraday cage. Each inductive element 908, 909 provides the propagation-enhancing portion of the touch sensor 310. In an embodiment, inductive elements can be provided in the form of discrete miniaturized coils, connected in series with capacitance-sensing elements, instead of, or in addition to, the inductance provided by the capacitance-sensing elements themselves.

FIG. 11

Physical connection points made with the touch-sensing element 707 are detailed in FIG. 11. The column 802 connects at a central point 901 of the first spiral-shaped capacitive-sensing-element 905 and an outer point 902. The row 808 connects between outer point 903 of the second spiral-shaped capacitive-sensing-element 906 and its central point 904.

Figure 12:
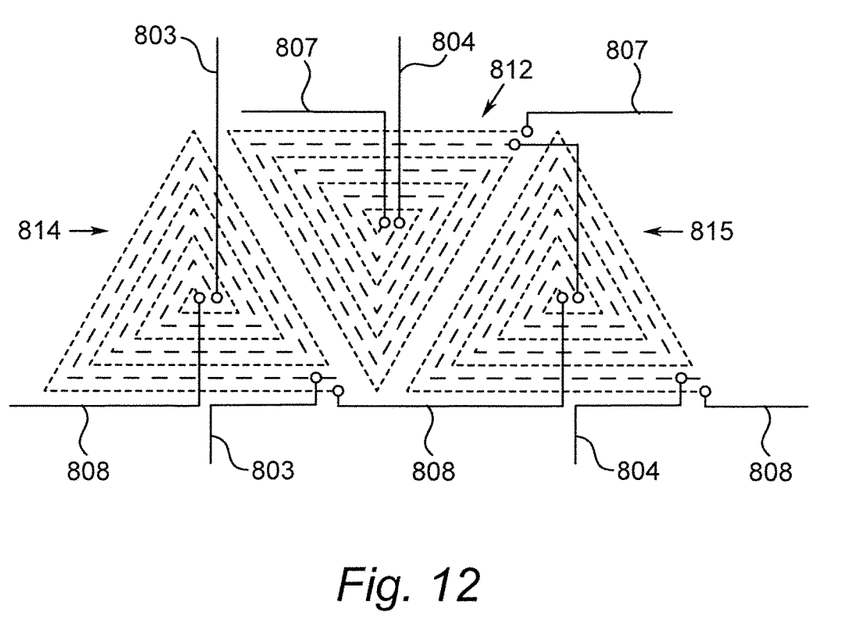
FIG. 12 details interconnections between touch-sensing elements of the kind shown in FIG. 9.

FIG. 12

Physical interconnections between multiple touch-sensing elements are illustrated in FIG. 12. touch-sensing elements 814 and 815 are located on the same row 808. Touch-sensing elements 812 and 815 are located on the same column. A thin film construction having printed conductors on either side is used to facilitate both the touch-sensing elements and their interconnections.

Figure 13:
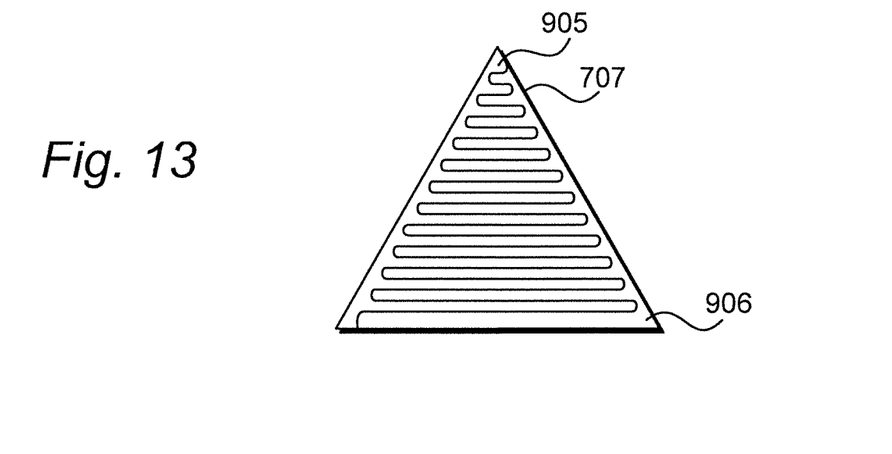
FIG. 13 shows a further embodiment of the touch-sensing element of the kind shown in FIG. 7.

FIG. 13

An alternative embodiment of the touch-sensing element 707 of the kind shown in FIG. 7 is detailed in FIG. 13. The two capacitance-sensing elements 905 and 906 are inter-digitated to maximize their mutual capacitance.

Figure 14:
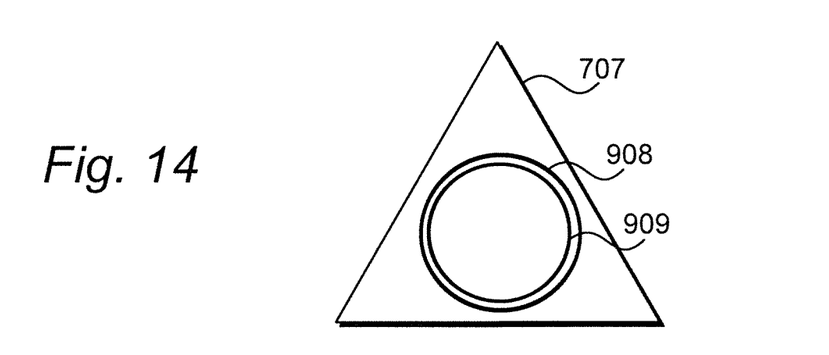
FIG. 14 shows a plan view of the touch-sensing element shown in FIG. 13.

FIG. 14

A plan view of the touch-sensing element 707 shown in FIG. 13 is detailed in FIG. 14. Beneath the inter-digitated capacitance-sensing elements 905 and 906 are located the two inductive elements 908 and 909, arranged concentrically.

Figure 15:
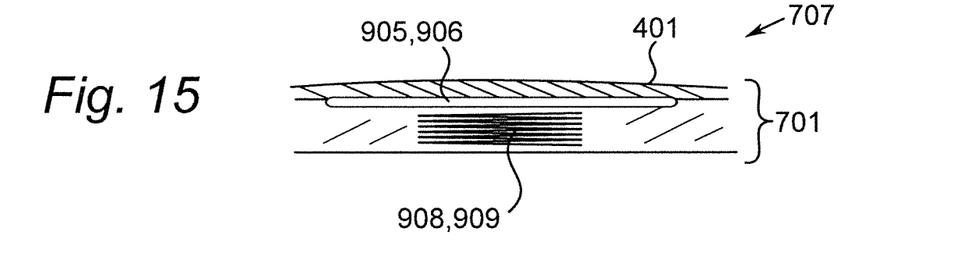
FIG. 15 shows a cross-section view of the touch-sensing element shown in FIG. 14.

FIG. 15

A cross-sectional view of the touch-sensing element 707 shown in FIGS. 13 and 14 is shown in FIG. 15. Beneath the outer surface 401 are the inter-digitated capacitance-sensing elements 905 and 906. Beneath that are the concentrically-arranged inductive elements 908 and 909. The advantage of the embodiment shown in FIGS. 13, 14 and 15 is that the inductive elements may be designed independently of touch-sensing requirements of capacitance. Optimization of the touch-sensing elements may then yield improved touch-sensitivity combined with improved propagation of the gestural radio signals 205. Furthermore, additional factors, such as the self-resonant properties of the inductive elements 908 and 909, may be optimized to provide an improved metamaterial effective at a carrier frequency 308 of the radio transmitter and receiver 306.

Figure 16:
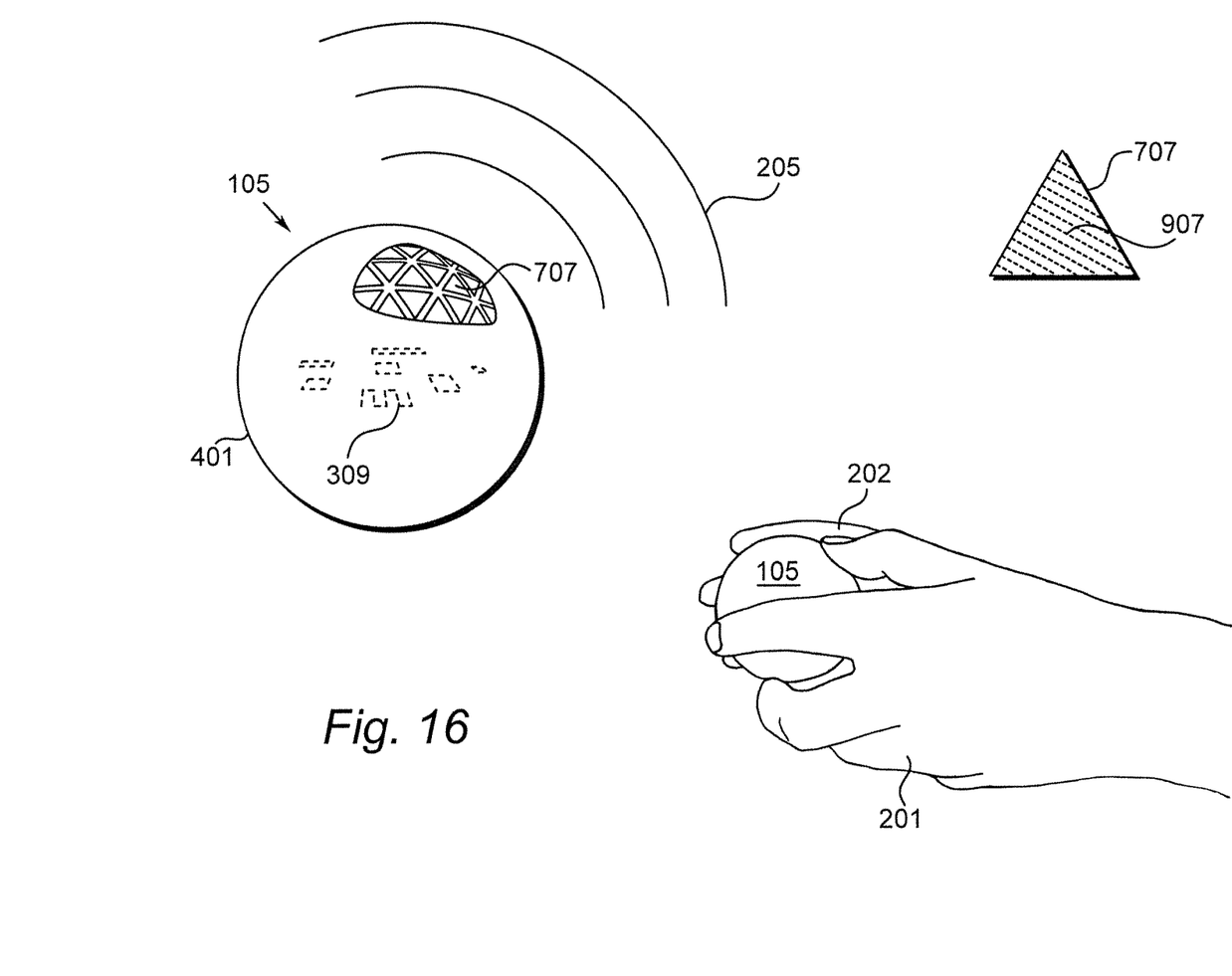
FIG. 16 illustrates the effect of the array of touch-sensing elements shown in FIG. 7.

FIG. 16

The properties of the embodiment shown in FIG. 7 are illustrated in FIG. 16. The input device 105 is manipulated by the user's hands 201 and 202, which rotate the device and or make touch gestures on the surface, including familiar multi-touch gestures such as pinch-and-zoom, and so on. Although the antenna 309 of the radio transmitter and receiver 306 is completely enclosed by the hemispherical multi-touch arrays 704 and 705, gestural data-signals 205 are transmitted through the outer surface 401 via the touch-responsive capacitance 907 of the touch-sensing element 707. This is due to the propagation-enhancing portion, including inductive elements 908 and 909, that reduce the degree to which the multi-touch arrays 704 and 705 are able to act as a Faraday cage. The propagation-enhancing portion is optimized for propagation of the gestural radio signals 205 through the touch-responsive capacitances, thereby forming a metamaterial effective at a carrier frequency 308 of the gestural radio signals 205.

Using the multi-touch arrays shown in FIG. 7, the spherical input device 105 is able to provide a similar kind of touch-responsiveness to which users of smartphones and other consumer touch-operated devices are familiar. Combined with rotation-detection, this provides a universal input device ideally suited to the navigation of three-dimensional environments.

What I claim is:

1. An apparatus for manual data input, comprising:
    a substantially spherical touch-sensitive outer surface arranged to be supported within the hands of a user;
    a capacitive touch sensor configured to generate surface touch signals for touched areas at substantially any location on said outer surface in response to a touch-responsive capacitance formed between capacitance-sensing elements of said touch sensor;
    a device processor for generating gestural data in response to said surface touch signals; and
    a radio transmitter for generating gestural radio signals from said gestural data and arranged to transmit said gestural radio signals through said outer surface;
    wherein said touch sensor includes a propagation-enhancing portion for enhancing propagation of said gestural radio signals through said touch-responsive capacitance.

2. The apparatus of claim 1, wherein said propagation-enhancing portion is functionally part of a said capacitance-sensing element.

3. The apparatus of claim 1, wherein at least one of said capacitance-sensing elements has a spiral shape and said propagation-enhancing portion is functionally part of said at least one capacitance-sensing element that has a spiral shape.

4. The apparatus of claim 1, wherein said propagation-enhancing portion is a metamaterial effective at a carrier frequency of said gestural radio signals.

5. The apparatus of claim 1, wherein said touch sensor is a multi-touch sensor that includes an array of touch-sensing elements, and each said touch-sensing element includes two said capacitance-sensing elements.

6. The apparatus of claim 5, wherein said array of touch-sensing elements includes inductive elements arranged to provide reactance between neighboring said touch-sensing elements, said reactance being effective at a carrier frequency of said gestural radio signals, and said propagation-enhancing portion includes said inductive elements.

7. The apparatus of claim 6, wherein each said inductive element is a functional part of a said touch-sensing element.

8. The apparatus of claim 6, wherein a plurality of said inductive elements each takes the form of a spiral.

9. The apparatus of claim 6,
    wherein each said inductive element is a functional part of one said touch-sensing element, and
    wherein a plurality of said inductive elements each takes the form of a spiral.

10. The apparatus of claim 9, wherein each said touch-sensing element includes two of said spiral-shaped inductive elements.

11. The apparatus of claim 6, wherein a majority of said touch-sensing elements in said array are triangularly-shaped, and said touch sensor is a sphere tiled with said touch-detecting elements.

12. The apparatus of claim 5, wherein said array of touch-sensing elements is a metamaterial at a carrier frequency of said gestural radio signals.

13. The apparatus of claim 12,
    wherein a majority of said touch-sensing elements in said array are triangularly-shaped, and said touch sensor is a sphere tiled with said touch-detecting elements.

14. The apparatus of claim 5, wherein said touch sensor includes two said arrays arranged to detect touch on respective hemispheres of said outer surface.

15. The apparatus of claim 1, further comprising a rotation-detector arranged to generate rotation-signals in response to a user manipulation of said outer surface, wherein said device processor is configured to generate said gestural data in response to said surface touch signals with said rotation-signals.

16. The apparatus of claim 15, wherein at least one of said capacitance-sensing elements has a spiral shape and said propagation-enhancing portion is functionally part of said at least one capacitance-sensing element that has a spiral shape.

17. The apparatus of claim 15, wherein said propagation-enhancing portion is a metamaterial effective at a carrier frequency of said gestural radio signals.

18. The apparatus of claim 15,
    wherein said touch sensor is a multi-touch sensor that includes an array of touch-sensing elements,
    wherein said array of touch-sensing elements includes inductive elements arranged to provide reactance between neighboring said touch-sensing elements, said reactance being effective at a carrier frequency of said gestural radio signals, and said propagation-enhancing portion includes said inductive elements.

19. A method of transmitting data through a substantially spherical outer surface supported within the hands of a user; said outer surface enclosing a radio transmitter, a device processor and a capacitive touch sensor responsive to touched areas at substantially any location on said outer surface; comprising the steps of:
    generating surface touch signals in response to a touch-responsive capacitance formed between a first capacitance-sensing element of said touch sensor and a second capacitance-sensing element of said touch sensor;
    providing said surface touch signals to said device processor;
    processing said surface touch signals to generate gestural data;
    supplying said gestural data to said radio transmitter to generate gestural radio signals; and
    transmitting said gestural radio signals through said touch-responsive capacitance.

20. The method of claim 19, wherein said step of transmitting said gestural radio signals through said touch-responsive capacitance further includes transmitting said gestural radio signals through a metamaterial effective at a carrier frequency of said radio transmitter.

* * * * *